Jan. 13, 1953 — A. G. PUJDA — 2,624,944
LAYOUT MEASURING TOOL
Filed Aug. 13, 1946 — 2 SHEETS—SHEET 2

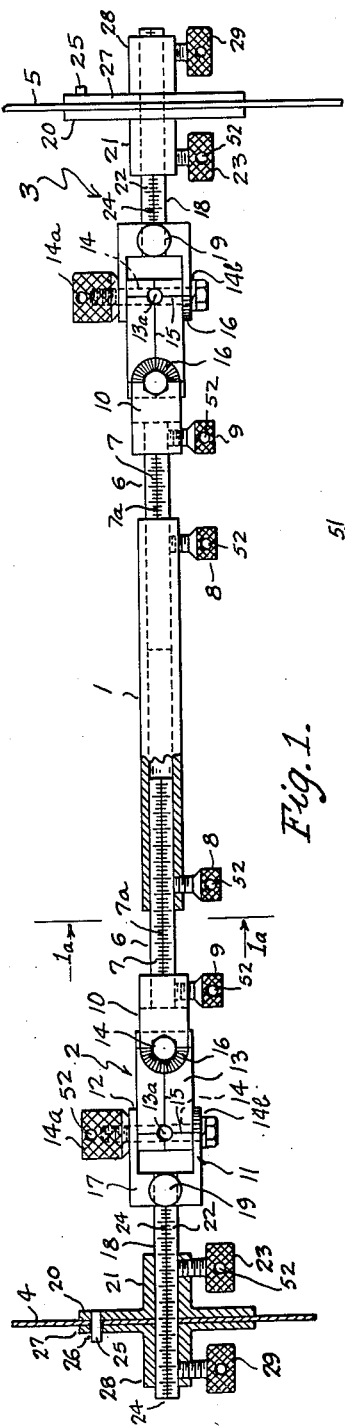

Inventor
Alfred G. Pujda
By Wooster & Davis
Attorneys

Patented Jan. 13, 1953

2,624,944

UNITED STATES PATENT OFFICE 2,624,944

LAYOUT MEASURING TOOL

Alfred G. Pujda, Bridgeport, Conn., assignor to Colonial Sheet Metal Works, Bridgeport, Conn., a partnership Application August 13, 1946, Serial No. 690,119

2 Claims. (Cl. 33—26)

This invention relates to a measuring tool to be used for laying out patterns on sheet metal or other suitable material which it is desired to form or shape.

It has for an object to provide a simple, convenient means for laying out such patterns.

It has for a further object to be simply operated, so that once the layout pattern is determined, a relatively inexperienced operator may then lay out identical patterns.

A further object is to provide such a tool whereby patterns for the side walls of articles having different sizes and shapes for top and bottom surfaces, even with surfaces offset with respect to each other, may be readily, quickly and accurately laid out.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In the drawings:

Fig. 1 is a top view of the device with portions in section to show detail;

Fig. 1a is a section substantially on line 1a—1a of Fig. 1;

Fig. 1b is a side view of a rod that may be used in setting up the device;

Fig. 2 is a view of a portion of the device looking from the top of Fig. 1;

Fig. 3 is an end or face view of the template support;

Fig. 4 is a view in perspective of the pivot links of the device;

Fig. 5 is a view in perspective of a base block of the device;

Figure 6:
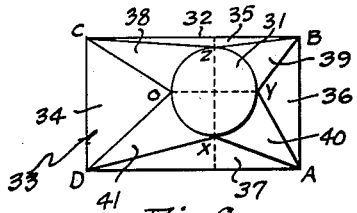
Fig. 6 is a top view of an object the pattern for which may be laid out with the device illustrating a problem as an example.

The device comprises a central sleeve 1 forming a coupling member which serves to hold the supporting assemblies 2 and 3 which support the templates 4 and 5. The supporting assemblies 2 and 3 for these templates are identical, and each comprises a graduated rod 6 one end of which is inserted into one end of the sleeve 1 so that it may be moved longitudinally as desired. A scale 7 provides a means for determining the particular setting of the rod 6 in relation to the sleeve 1, and includes a longitudinal center line 7a, and the rod 6 may be set at any point desired and clamped by use of the set screw or locking bolt 8. Secured to the other end of the rod 6 by means of a set screw 9 is a U-shaped or forked block 10 forming a pivot link. Pivoted between the legs 11 and 12 of the U-shaped block 10 is a rectangular block 13 which is pivoted between the legs 11 and 12 by suitable means, such as the bolt and adjustable nut assembly comprising a bolt 14 through the legs 11 and 12 and the block 13, with a clamping nut 14a and a lock washer 14b, by which the link may be clamped and held in angular adjusted positions. Center lines 15 on the block 13 coupled with radial and edge graduations 16 on the end of the leg 11 serve to indicate the amount that the block 13 is pivoted or its angular relation to the U-block 10.

At the opposite end of the block 13 from the U-shaped block or link 10 is another U-shaped block or link 17 which is also pivoted to the block 13 by means of a bolt 14 and adjustable nut 14a and lock washer 14b. The U-block or link 17 may be pivoted to the block 13 so that its axis of rotation is substantially at 90° to the axis of rotation of the block or link 10. Thus the two U-shaped members pivoted to the block 13 comprise substantially a universal joint which enables the graduated rod 18 which is secured into the block or link 17 by means of the adjustable set screw 19 to be located off center with relation to the sleeve 1. If desired, the link 17 may be turned 90° about the axis of block 13 and secured in this position passing the bolt 14 through opening 13a at right angles to opening 13b through the block. In this position the link 17 would swing in the same plane as link 10.

Supporting and locating means for the template 4 is mounted on the rod 18 and comprises a circular plate 20 provided with a hub 21 which is mounted on the rod 18. This rod 18 is provided with a scale 22 including a longitudinal center line 24 so that the plate 20 may be adjusted to the desired position on the rod 18, both longitudinally and angularly, and secured therein by means of the adjustable screw 23. The rod 18 is provided with a longitudinal center line 24 which, coupled with a scale 20a, as shown in Fig. 3, inscribed on the face of the plate 20, provides a means for determining the angular location of the locating pin 25 mounted in the plate 20, about the longitudinal axis. The pin 25 is used as a means for locating the template 4 when the template 4 is mounted on the rod 18, the pin passing through a properly located opening 26 in the template 4. A second plate 27 which is provided with a hub 28 and secured to the rod 18 by means of an adjustable screw 29 is clamped to the opposite side of the template 4 from the plate 20, holding the template 4 securely between the plates 20 and 27. Plate 27 and hub 28 form a flanged sleeve cooperating with support 20 to mount the template. The rods 6 and 18 may be of any desired lengths, depending on the size of the work to be done, but for ordinary work are made 6½ and 12½ inches in length. The set screws or locking bolts can be readily set up tight by means of a leverage rod 51 (Fig. 1b) of any desired length and of a size to fit in openings 52 in the nuts and screws. The heads of the screws are preferably knurled to facilitate operation. The second template 5 is mounted in the opposite end of the central coupling sleeve 1 by a similar assembly 3 and may be adjusted with relation to this coupling sleeve in the same manner as template 4.

Figure 9:
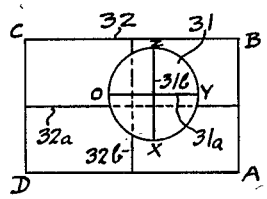
Fig. 9 is a view showing the bottom and top portions of the object of Fig. 6 superimposed on each other to illustrate the relation between the centers of the top and bottom surfaces of the problem.
Figure 7:
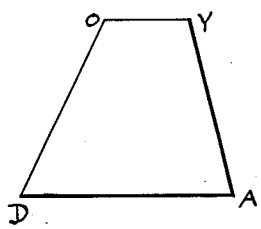
Fig. 7 is a view looking from the bottom of Fig. 6 and is a front elevation of the problem.
Figure 8:
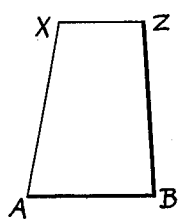
Fig. 8 is a view looking from the right of Fig. 6, and is a side elevation of the problem.

To illustrate use of the device we will take, for example, the problem illustrated in Figs. 6, 7 and 8, which comprise a truncated pyramidal type object to be made of sheet material, for example, sheet metal, and comprising a circular shape 31 at its top parallel to a rectangular base 32, with connecting inclined side walls 33. The problem is to develop the side walls on the sheet of material 30 to cut a member to the proper outline so that its opposite ends may be connected and form the side walls 33 of the article, the side walls comprising four triangular surfaces 34, 35, 36 and 37 connected by the transversely curved tapered corner portions 38, 39, 40 and 41. Fig. 7 gives the front elevation of the problem looking toward the bottom of Fig. 6, while Fig. 8 represents the side elevation looking from the right of Fig. 6. Fig. 9 shows the rectangular bottom shape 32 to scale and a circular top shape 31, also to scale, and imposed on the rectangular bottom shape, each provided with cross lines 32a and 32b, and 31a and 31b respectively at right angles to each other. It is also to be noted that in this problem the center of the top figure 31 is offset, both to the right and above the center of the rectangular figure 32, and therefore the side wall 33 would be developed accordingly, so that the top and bottom shapes will be similarly offset when the article is assembled.

Figure 13:
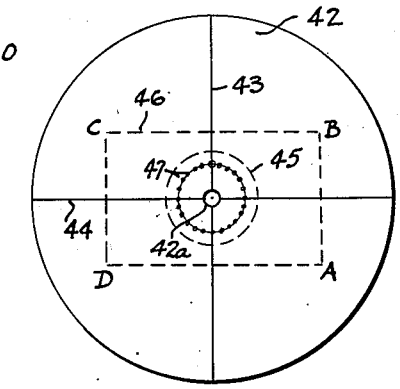
Fig. 13 is a face view of a blank template which may be employed for forming the templates to be used in the device in laying out any given problem.

The first step is to lay off on a template blank 42 (Fig. 13) provided with diametral scribe lines 43 and 44 placed at right angles to each other, a circle 45 of a size of the shape 31, about the center of the blank, and then cutting the blank to form the circular template 4. Then another template blank, the same as blank 42, is scribed with the rectangular shape 32, as shown by the broken lines 46 of Fig. 13, and then cut to this size and shape along these lines to form the template 5. The blank may be provided with a series of openings 47 of a size to fit the pin 26 on the template support 20, the blank being preferably provided with a series of these openings arranged in a circle about the center and a suitable uniform distance apart, say for example a quarter inch, so that the finished template can be arranged at any desired angular position on the template support. The template blank is also provided with a central opening 42a to fit the rods 18.

Figure 10:
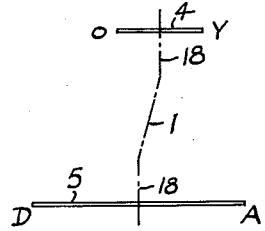
Fig. 10 is a schematic drawing of the device showing the setting of the device for determining the relationship of the vertical axes of Fig. 9.
Figure 11:
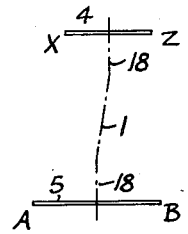
Fig. 11 is a schematic drawing of the device showing the setting of the device for determining the relationship of the horizontal axes of Fig. 9.
Figure 12:
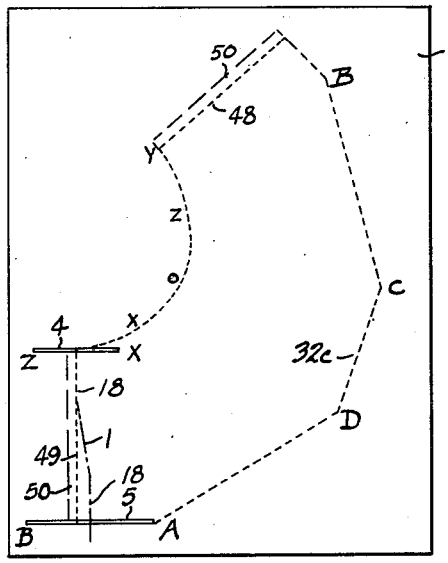
Fig. 12 is a plan view of a rectangular sheet of material with dotted lines representing the pattern laid out to form the object of Fig. 6, and with the device represented to show its operation in laying out the pattern.

The two templates 4 and 5 are then mounted on the device of Fig. 1 in the two assemblies 2 and 3, as above described. The two rods 6 can be set at the same angular relation to central sleeve 1 by setting the longitudinal center lines 7a on the diagonal lines 1a (Fig. 1a) scribed on the ends of the sleeve 1 and at right angles to each other. The two templates are placed in the proper angular relation to each other about the longitudinal axis of the device and the axis of the central coupling 1 by first setting the pivot links 10 and 17 with respect to the rods 6 and 18 respectively, by means of the diagonal lines 10a on the end surfaces of the links and lining them up with the longitudinal center lines 7a and 24 of the rods. The template supports 20 can also be properly lined up with the longitudinal center lines 7a and 24 by means of the radial lines 20a on the face of the flange 20, as shown in Fig. 3. The templates are adjusted at the proper distance apart by means of adjustment on the rods 6 and 18, so that the templates are spaced to correspond with the height of the two elevations of Figs. 7 and 8 corresponding to the height of the finished article. The centers or axes of these two templates, represented by the axes of the two bars 18 (Fig. 10) are then offset to correspond with the distance the vertical centers 31b and 32b are offset in Fig. 9. This is accomplished by swinging either one of the two pivot links 10 and 17 in each assembly angularly about their pivot bolts 14 at the opposite ends in the opposite assemblies for the two templates and securing them in these angularly adjusted positions. Then the two centers of the two templates are offset in a plane at right angles to this offset indicated by Fig. 10 corresponding to the offset between the center lines 31a and 32a, as indicated in Fig. 11, this being accomplished by swinging the other link 10 or 17 about its pivot bolt 14, which is at right angles to the pivot bolt for the first adjustment. The centers of the two templates are, therefore, now properly offset in both planes at right angles to each other corresponding to the offsets of the center of figure 31 with respect to the center of figure 32 corresponding to the offsets to the right and above vertical and horizontal diagonal lines, as indicated in Fig. 9. The edges of the two templates are now covered with chalk or some other marking material and they are set on a sheet metal blank 30, or blank of other material to be used, as indicated in Fig. 12. Then by rotating the two templates on their peripheries over the surface of the sheet 30, the outlines 31c and 32c will be marked on the surface of the sheet 30 to form the peripheries of the top and bottom figures 31 and 32 of the article to be formed. Throughout Figs. 6 to 13 the letters A, B, C, D, O, X, Y, Z indicate corresponding points on the templates and the diagram. The sheet 30 can then be cut along the outline of the figure laid out, and this will be a development of the side 33 of the problem. It can be assembled by connecting the seam lines 48 and 49 by soldering, welding or any other suitable standard means.

If overlapped joints are required they may be provided for by additional material 50 allowed on the seam lines.

Thus it is clear, with this device, if it is desired to lay out the pattern for the object shown in Fig. 6, templates 4 and 5 are secured to the device, as heretofore described. The center axes of rotation of the templates 4 and 5 may be in different planes, thus allowing one template 5 to be off center with relation to the template 4, as shown in Figs. 10 and 11. A sheet 30 on which the pattern is to be laid out is covered with a suitable material, such as Prussian blue or chalk or other similar material, which will show a mark when the device is run over it, or chalk may be placed on the edges of the templates, thereby leaving a mark as the device is operated on the plate 30. The device is then rolled to form the pattern, shown in dotted lines, Fig. 12, the template 5 describing straight lines which form the base of the object of Fig. 6, and the template 4 describing a partial circle or a curve to form the top of the figure shown in Fig. 6. It is clear that any type of figure may be marked out on the sheet 30 through the use of different templates and different settings of the device, and once the templates are fixed and the settings of the device determined, a relatively inexperienced operator, by following prepared instructions, may then lay out as many duplicates of a pattern as desired.

Having thus set forth the nature of my invention, I claim:

1. A layout tool of the character described comprising a pair of plate templates each being adapted to be rolled on its periphery on the surface of a sheet of material to form two spaced lines thereon, means connecting said templates in parallel spaced relation including a central sleeve coupling, a graduated rod telescoping in each end of said sleeve, means for securing each rod in adjusted positions, a link assembly mounted on each rod including a base block and a forked link pivoted to each end of the block to swing about axes at right angles to each other, means for securing one link to the rod, a template support, and means for mounting the template support on the other link.

2. A layout tool of the character described comprising a pair of plate templates each being adapted to be rolled on its periphery on the surface of a sheet of material to form two spaced lines thereon, means connecting said templates in parallel spaced relation including a central sleeve coupling, a graduated rod telescoped in each end of said coupling, means for securing the rods in adjusted positions, a link assembly for each template comprising a block, a pair of forked links pivoted one to each of the opposite ends of the block to swing about axes at right angles to each other, means for clamping the links in different angular positions, means for connecting one of the links of each pair to one of the rods, a second graduated rod connected to the other link of each pair, a support for each template comprising a flanged sleeve mounted one on each of the second rods, and means for securing the template supports in adjusted positions on said latter rods.

ALFRED G. PUJDA.

REFERENCES CITED

The following references are of record in the file of this patent:

UNITED STATES PATENTS

| Number | Name | Date |
|---|---|---|
| 809,432 | Darrschmidt | Jan. 9, 1906 |
| 1,211,347 | Plofchan et al. | Jan. 2, 1917 |
| 1,482,186 | Fales | Jan. 29, 1924 |
| 2,334,039 | Rueb | Nov. 9, 1943 |

FOREIGN PATENTS

| Number | Country | Date |
|---|---|---|
| 27,794 | Great Britain | 1911 |
| 128,677 | Germany | Mar. 3, 1902 |
| 347,410 | Germany | Jan. 18, 1922 |